United States Patent

Conrad

[15] 3,640,607
[45] Feb. 8, 1972

[54] THREE-ELEMENT MICROPHOTOGRAPHIC OBJECTIVE LENS

[72] Inventor: Lawrence H. Conrad, Maplewood, Minn.
[73] Assignee: Minnesota Mining and Manufacturing Company, Saint Paul, Minn.
[22] Filed: Nov. 20, 1970
[21] Appl. No.: 91,437

[52] U.S. Cl. .................................................................. 350/226
[51] Int. Cl. ...................................................... G02b 9/16
[58] Field of Search ................................................. 350/226

[56] References Cited

UNITED STATES PATENTS 2,453,260  11/1948  Pestrecov ............................. 350/226
3,039,359  6/1962  Eggert et al. ........................... 350/226

Primary Examiner—John K. Corbin
Attorney—Kinney, Alexander, Sell, Steldt & Delahunt

[57] ABSTRACT

A three-element $f/4.5$, 19.5× magnification objective lens comprising three airspaced elements from front to rear including a planoconvex lens element, a biconcave lens element and a biconvex lens element.

1 Claims, 9 Drawing Figures

PATENTED FEB 8 1972

3,640,607

SHEET 1 OF 2

INVENTOR.
LAWRENCE H. CONRAD
BY Kinney, Alexander
Sell, Steldt, DeLaHunt
ATTORNEYS

THREE-ELEMENT MICROPHOTOGRAPHIC OBJECTIVE LENS

The present invention relates to a three-element objective lens particularly adapted for use in microphotography.

Microphotographic objective lenses must have high resolution and maximum contrast with minimum aberrations to provide acceptable results. Acceptable results are obtained if the resolution provided by the lens is at least 100 line pairs per mm. at 10 percent contrast. Three element lenses constructed according to prior art have not proven satisfactory for use in microphotography. To obtain the desired resolution, contrast and correction of the lens aberrations, prior art microphotographic objective lenses have generally consisted of a large number of lens elements as evidenced by U.S. Pat. No. 3,450,463. Such lenses have, however, been unduly expensive because of the large number of lens elements.

According to the present invention there is provided a three element lens comprising from front to rear a planoconvex lens element, a biconcave lens element, and a biconvex lens element which provides the resolution and contrast desirable for microphotography while at the same time being extremely well corrected for all of the lens aberrations.

Figure 1:
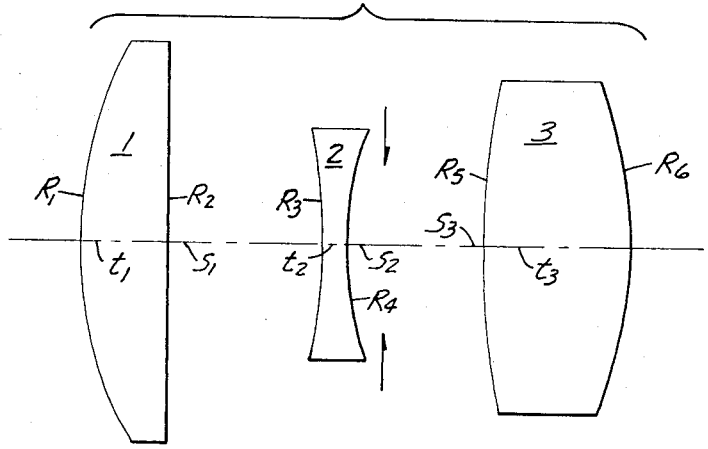

The novel features and advantages of the present invention will become apparent after reading the following description which refers to the accompanying drawing wherein:

FIG. 1 is a diagrammatic axial cross section of a lens constructed in accordance with the present invention;

FIGS. 2, 3, 4 and 5 are tangential oblique ray intercept curves along the lens axis and through 50 percent, 75 percent and 100 percent, respectively, of its field of view; and FIGS. 6, 7, 8 and 9 are modulation transfer function traces along the lens axis and through 50 percent, 75 percent and 100 percent, respectively, of its field of view.

The microphotographic objective lens of the present invention comprises from front to rear a planoconvex lens element 1, a biconcave lens element 2, and a biconvex lens element 3. The three lens elements 1, 2 and 3 are airspaced and the diaphragm is located between lens elements 2 and 3.

Numerical data for constructing an objective lens according to the invention as outlined above is given in the following table in which the lens elements are numbered from front to rear, N is the index of refraction of the lens elements for the D line, V is the index of dispersion, and R, T and S refer, respectively, to the radii of curvature of the lens surfaces, the thickness of the lens elements and the air spaces between the elements, numbered by subscript from front to rear. The plus and minus values of the radii R denote surfaces that are, respectively, convex and concave toward the front.

Equivalent Focal Length=42.6 m.m. f/4.5

| Element | $N_D$ | V | Radii (m.m.) | Thicknesses and spacings (m.m.) |
|---|---|---|---|---|
| 1 | 1.613 | 58.6 | $R_1=+14.768$ | $T_1=3.12$ |
|   |       |      | $R_2=\infty$  | $S_1=5.56$ |
| 2 | 1.673 | 32.1 | $R_3=-21.641$ | $T_2=.80$ |
|   |       |      | $R_4=+11.971$ | $S_2=1.00$ |
| 3 | 1.607 | 59.3 | $R_5=+35.573$ | $T_3=3.81$ |
|   |       |      | $R_6=-16.688$ | $T_3=5.28$ |

Figure 2:
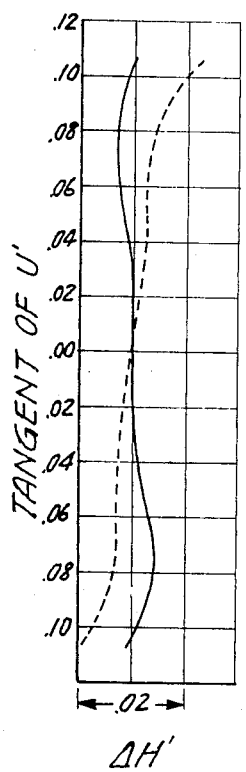
Figure 3:
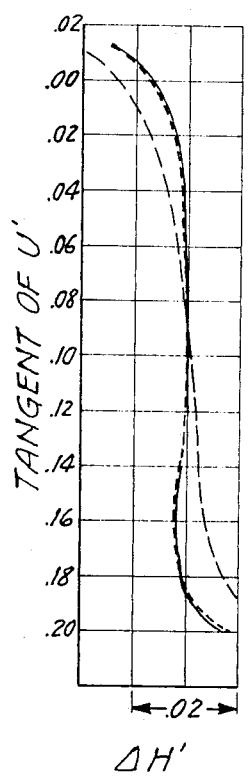
Figure 4:
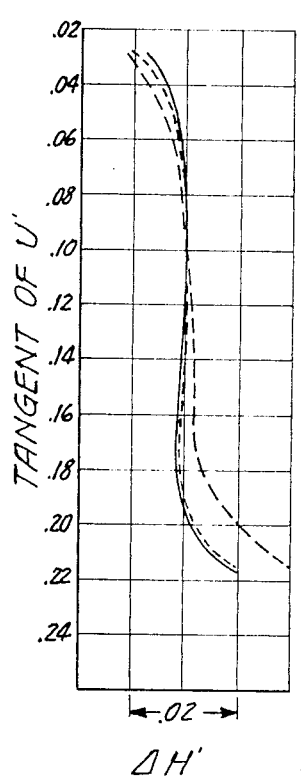
Figure 5:
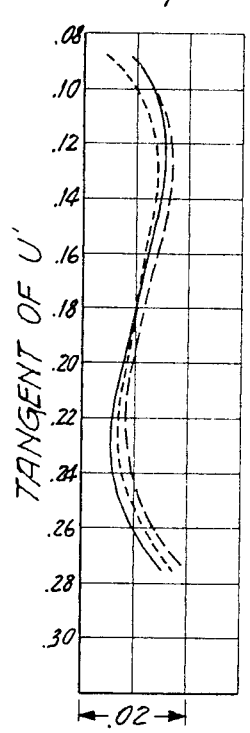
Figure 6:
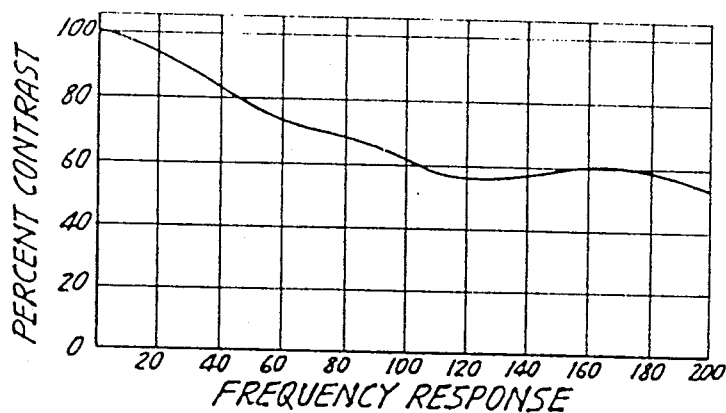
Figure 7:
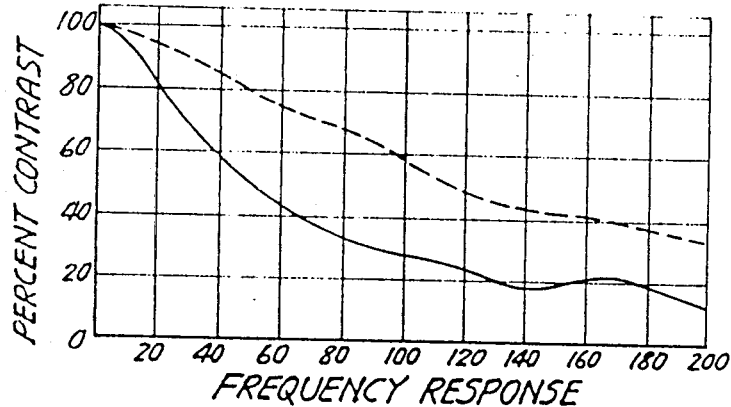
Figure 8:
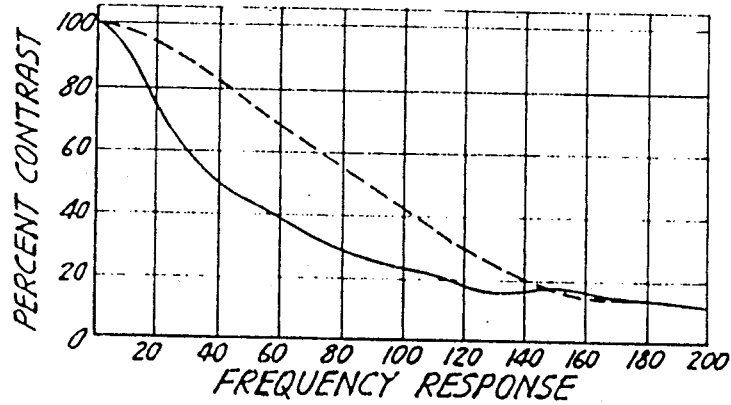
Figure 9:
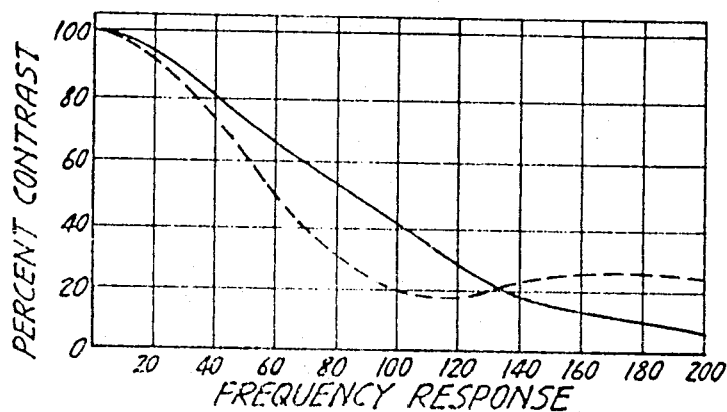

A lens according to the above specifications may be constructed of common, inexpensive optical glass and it has a 19.5X magnification, a field of view having a 10.74° half angle and less than 0.3 percent distortion. The graphs of FIGS. 2 through 5 illustrate tangential-oblique ray intercept curves along the axis and through 50 percent, 75 percent and 100 percent of the field of view. The full lines represent the tangential-oblique ray intercept curves for the Sodium "D" line while the long segment broken lines and the short segment broken lines, respectively, represent the curves for the Hydrogen "F" and "C" lines. In FIG. 2 the curves for the Sodium "D" line and the Hydrogen "C" line are coincident. In the graphs of FIGS. 2 through 5 U' is the refracted ray convergence angle and ΔH' is the deviation in mm. in the ray intercept height in the image plane where H', the ray intercept height in the image plane, is 8.5 mm. at 100 percent of field. It can readily be seen from the fact that these curves are made nearly straight vertical lines that a lens constructed in accordance with the present invention is extremely well corrected for spherical aberration and coma and produces very little, if any, curvature of field. The extremely small distances between the curves for the Sodium "D" and the Hydrogen "C" and "F" lines show that the lens is well corrected for the chromatic aberrations.

In the graphs of FIGS. 6 through 9 the full lines represent the tangential ray modulation transfer function traces and the broken lines represent the sagittal ray modulation transfer function traces for the lens. The units of Frequency Response are line pairs per mm. These graphs are weighted so that the Sodium "D" line contributes 60 percent and the Hydrogen "C" and "F" lines each contribute 20 percent of the energy density. This color weighting has been found to most nearly produce a white light spectrum which is optimum for both color and black and white photography. The fact that the tangential ray and the sagittal ray traces are close together shows that the lens is well corrected for astigmatism. Furthermore, from these graphs it can be seen that the contrast is above 10 percent at a resolution of 160 line pairs per millimeter. The resolution, contrast and extremely well corrected aberrations provided by this lens construction is, therefore, as desired in microphotography.

Although the invention has been described in detail with reference to a preferred embodiment thereof, it will be understood that variations and modifications can be affected without departing from the spirit and scope of the invention as described herein above.

What I claim is:

1. A three-element objective lens comprising from front to rear a planoconvex lens element, a biconcave lens element, and a biconvex lens element, the lens elements having substantially the following characteristics and spacial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacing between the lens elements, numbered by subscript from front to rear:

| Element | $N_D$ | V | Radii (m.m.) | Thicknesses and spacings (m.m.) |
|---|---|---|---|---|
| 1 | 1.613 | 58.6 | $R_1=+14.768$ | $T_1=3.12$ |
|   |       |      | $R_2=\infty$  | $S_1=5.56$ |
| 2 | 1.673 | 32.1 | $R_3=-21.641$ | $T_2=.80$ |
|   |       |      | $R_4=+11.971$ | $S_2=1.00$ |
| 3 | 1.607 | 59.3 | $R_5=+35.573$ | $S_3=3.81$ |
|   |       |      | $R_6=-16.688$ | $T_3=5.28$ |

* * * * *